United States Patent
Kite

(10) Patent No.: US 10,501,255 B2
(45) Date of Patent: Dec. 10, 2019

(54) BEVERAGE CONTAINER WITH ICE STORAGE FEATURE

(71) Applicant: Rachel Kite, McKinney, TX (US)

(72) Inventor: Rachel Kite, McKinney, TX (US)

( * ) Notice: Subject to any disclaimer, the term of this patent is extended or adjusted under 35 U.S.C. 154(b) by 0 days.

(21) Appl. No.: 16/024,893

(22) Filed: Jul. 1, 2018

(65) Prior Publication Data

US 2019/0009969 A1     Jan. 10, 2019

Related U.S. Application Data

(60) Provisional application No. 62/530,189, filed on Jul. 8, 2017.

(51) Int. Cl.
| | |
|---|---|
| *A47G 19/22* | (2006.01) |
| *B65D 25/04* | (2006.01) |
| *B65D 51/28* | (2006.01) |
| *B65D 81/32* | (2006.01) |

(52) U.S. Cl.
CPC ...... *B65D 81/3211* (2013.01); *A47G 19/2205* (2013.01); *B65D 25/04* (2013.01); *B65D 51/28* (2013.01)

(58) Field of Classification Search
CPC ............ A47G 19/2205; A47G 19/2255; B65D 25/04; B65D 25/08; B65D 51/28; B65D 51/2807; B65D 51/2857; B65D 51/2885; B65D 51/2892; B65D 81/32; B65D 81/3205; B65D 81/3211
USPC ........ 206/219, 220, 221, 222; 220/501, 502, 220/503, 504, 505
See application file for complete search history.

(56) References Cited

U.S. PATENT DOCUMENTS

| | | | | |
|---|---|---|---|---|
| 5,008,083 | A * | 4/1991 | Dickie | B01L 3/5021 |
| | | | | 209/453 |
| 5,823,380 | A * | 10/1998 | Cox | A47G 19/2266 |
| | | | | 220/502 |
| 6,126,032 | A * | 10/2000 | Herzog | B65D 81/3211 |
| | | | | 206/221 |
| 7,798,346 | B2 * | 9/2010 | Nelson | B65D 81/3205 |
| | | | | 206/501 |
| 8,146,758 | B1 * | 4/2012 | Peres | B65D 81/3205 |
| | | | | 206/219 |
| 8,899,427 | B2 * | 12/2014 | Harris | A61J 9/00 |
| | | | | 206/219 |
| 9,004,301 | B2 * | 4/2015 | Wahlstrom | B65D 81/3211 |
| | | | | 206/219 |
| 9,016,488 | B1 * | 4/2015 | Peres | B65D 81/3205 |
| | | | | 206/219 |

(Continued)

*Primary Examiner* — Joshua E Rodden

(57) ABSTRACT

In its preferred embodiment, my invention provides a solution for a reusable product that provides the ability to conveniently, effectively and immediately cool a consumable liquid in a container regardless of where you are, without the delay involved by requiring to place any portion of the container into a refrigerator, to increase the time that a cooling agent's (ice) lowered temperature is preserved prior to exposure to the consumable liquid, to provide enhanced cooling impact through direct and maximum surface contact between the cooling agent and consumable liquid, to do so for any liquid the person desires to consume and that is not limited in its design/fit/configuration in order to accommodate a specific commercially available prepackaged container.

5 Claims, 3 Drawing Sheets

(56) References Cited

U.S. PATENT DOCUMENTS

| | | | |
|---|---|---|---|
| 2007/0017890 A1* | 1/2007 | Al-Jadh | A61J 9/00 215/11.1 |
| 2007/0221601 A1* | 9/2007 | Eitrheim | A61J 9/001 215/6 |
| 2009/0178940 A1* | 7/2009 | Said | A61J 9/00 206/221 |
| 2009/0188884 A1* | 7/2009 | Nelson | A61J 9/008 215/6 |
| 2011/0272379 A1* | 11/2011 | Eghbaly | B65D 25/08 215/6 |
| 2012/0055935 A1* | 3/2012 | Peres | B65D 25/08 220/502 |
| 2015/0036455 A1* | 2/2015 | Bennett | A47J 43/27 366/184 |
| 2015/0225130 A1* | 8/2015 | Hall | B65D 81/3211 206/221 |
| 2018/0238727 A1* | 8/2018 | Wong | G01F 11/40 |

* cited by examiner

BEVERAGE CONTAINER WITH ICE STORAGE FEATURE

CROSS REFERENCE TO RELATED APPLICATIONS

This application claims the earlier filing date of Provisional Patent Filing #62/530,189, received 8 Jul. 2017.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention presents an improvement to the convenience and ease of lowering fluid temperatures in a container suitable to consume the liquid from. In its preferred embodiment, my invention presents a product whereby an individual can easily and quickly lower the temperature of a liquid being consumed, such as a chilled coffee that has warmed or a hot coffee that has cooled, without having to be near a refrigerator or a source of ice to add to the container. My invention allows the user to always have the container directly available for use and to make use of the container to hold whatever liquid the user desires to consume without that liquid being available commercially in a predefined container (e.g. soda can or bottle). Further, my invention provides an airtight compartment in which to conserve a cooling medium (e.g. ice) until such time when the user chooses to expose that ice to the liquid in order to cool the liquid.

In today's world we have an ever-increasing number of retail outlets where beverages can be purchased and consumed while away from the home. For example, Starbucks, Caribou, Dunkin Donuts, miscellaneous fast food outlets, etc. Additionally, a person may wish to consume a liquid that they have prepared themselves, rather than purchase what is available commercially in a can, bottle, pouch, etc.

This beverage is frequently consumed while riding or driving in a vehicle to work, or it may be consumed while at work or relaxing out of doors. These locations are all away from any source of ice (cubed or crushed) or other means of cooling.

In addition, we have available to us any number of containers into which these liquids can be transferred and thereby contained while being consumed. Many of these containers are shaped to fit into a special designed space in our vehicle, typically referred to as a 'cup holder'.

The challenge is to enjoy whatever beverage is desired at a chilled temperature. This chilling is typically achieved through the use of ice. The containers in use today may have features that lengthen the time a beverage remains at its original temperature through the use of insulating materials and design features such as a vacuum space between 2 layers of material, referred to as a 'double walled' design.

Even with this, the physics of heat transfer still remains, and the liquid eventually approaches the temperature of the surrounding external environment. Hot liquids will cool off and cold liquids with warm up. To further chill the temperature at this point one will typically require the addition of ice, or it will be required to insert the container into a cooling environment (refrigerator or freezer).

This has created a need for a product . . .
to chill a warm liquid, regardless of where you are, without the delay involved by having to place the container into a refrigerator and then wait while the temperature of the contained liquid lowers,
to lengthen the time that a cooling agent's (ice) lower temperature is preserved prior to exposing to the consumable liquid,
to do so for any liquid the person desires to consume without the limitation imposed by a prepackaged container's shape, configuration or size.

None of the prior art discloses a device that supports the chilling of a liquid immediately, regardless of where one is at the time, with no limitation in the choice of consumable liquid and no dependency on the size and shape of container in which the desired liquid is available commercially, and with no requirement for use of a cooling device (e.g. freezer).

For example:

Broadbent—U.S. Pat. No. 6,112,537 Beverage Container With Ice Compartment claims a container with 2 separate compartments, 1 for a cooling agent and the other for the original consumable substance. Broadbent states "A primary objective of this invention is to provide a beverage container for selling pre-packaged beverages". Addionally, Broadbent's design requires a removable seal to separate the contents in each compartment. This seal is not reusable, requiring the device to be disposed of after a single use. Further, lowering the temperature of the cooling substance to the freezing point without freezing the consumable substance requires "special equipment", according to Broadbent. My invention requires no special equipment for use and is completely reusable.

Druyan—U.S. Pat. No. 8,371,470 Container for Dispensing Liquid Doses describes a compartmented container wherein the purpose of the device is to control the amount of liquid dispensed from the container with each rotation of the container from the vertical to a non-vertical orientation where-in liquid spills from the withdrawal chamber for consumption. Notwithstanding the activity of rotating the container in order to dispense a measured amount of consumable liquid, there is no specific provision made for a mixing of substances held in any of the 3 compartments therein detailed. Therefore, while Druyan presents a multi-compartmental device to be used with liquids, there is no claim for a design that would lower the temperature of the consumable liquid through an intermingling with a cooling agent (e.g. ice).

Duff, et. al. U.S. Pat. No. 6,516,967 Canned and Bottled Beverage Holder speaks to a container that a commercially available can or bottle in position and in contact within a cold medium which then lowers the temperature of the liquid in the can/bottle. This design depends solely on the consumable liquid being available in a specific can or bottle and requires additional add on parts to accommodate each and every change in the size of the can or bottle. My design presents the user with the option of consuming any liquid they desire, and does not require a design to match any specific commercially available container.

Wilson—U.S. Pat. No. 6,213,335 Stackable Container with Internal Divider describes a compartmentalized vessel wherein all compartments are open to the air, thereby unable to preserve the lower temperature of the cooling agent contained in one or more of the defined compartments for later use, at a time defined by the user, to cool the liquid being consumed. The invention I present in this application allows the cooling agent to be self-contained, thereby preserving its colder state, until such time as the user desires to expose it to the consumable liquid in order to cool that liquid.

Tones—U.S. Pat. No. 9,604,747 Compartmented Beverage Bottle is granted claims to a vessel described as having multiple compartments and a valve connection between the compartments that "are unitarily formed as a single piece", thereby negating the use of the secondary compartment for the loading and carrying of ice (a solid) to provide for cooling of the liquid carried in the primary compartment. Torres's design is intended to preserve the liquid in the lower compartment "against flavor loss, loss of carbonation, and spoilage". If, however, one was to fill only the lower compartment with water, for example, and then freeze that water in order to allow the liquid in the upper compartment to be cooled by that frozen water, it would require that the device not be available to the user during the time it is being frozen, and it would not allow a significant amount of the liquid to come into contact with the ice through the small orifice connecting the upper and lower compartments. This would result in an inefficient cooling of the consumable liquid.

Kupperman et al.—U.S. Pat. No. 4,301,942 Insulated Container describes a multi-compartment vessel where-in the contents of all compartments are continually exposed to one another, thereby depriving the user from choosing at what time they wish to cool the consumable liquid and shortening the time that the cooling agent is able to retain its lowered temperature as it is continually exposed to the thermal exchange reaction involving the substance in which it is in contact.

Broadbent—U.S. Pat. No. 6,276,163 Beverage Container With Ice Compartment presents a dual chambered vessel whose primary objective "is to provide a beverage container for selling pre-packaged beverages that has a built-in ice cube" and that requires "a dual-temperature-refrigerating device". This design does not support the freedom of use inherent in my design, and also requires the use of water which is frozen after it has been deposited into this container. During the 'freeze time' this vessel is therefore not available for use, whereas my design is always available for use, with the ability for adding pre-made ice to the cooling chamber quickly and easily.

Gallo—U.S. Pat. No. 6,471,085 Temperature Cup provides for a vessel in which the contained liquid travels from a first chamber into a second chamber in which it is said to undergo a temperature change. No provision is made for containment of a secondary cooling substance to enhance that temperature change.

Shimazaki—U.S. Pat. No. 6,588,621 Beverage Bottle Cooling Method and Apparatus With Assembly for Holding Ice and Water claims a design that is completely dependent on "a commercial beverage bottle" that is therein exposed to cooling through contact with cold ice/water. This limits what can be consumed to only those substances that are sold commercially, and also limits the use of the claimed apparatus to beverages sold in a vessel of the appropriate shape and size that the invention is made to accommodate. My invention eliminates these limitations.

Guilford III et al.—U.S. Pat. No. 7,287,656 Container for Promoting Thermal Transfer claims a design that includes 2 compartments, 1 inside the other and in an inverted orientation compared to the outer compartment. The inner compartment is intended to hold water which is then frozen, and then used as a means to lower the temperature of the liquid in the outer compartment. Similar to Broadbent U.S. Pat. No. 6,276,163, this design requires that the product is unavailable for use during the time it is in a device meant to freeze the water. This design further introduces a secondary material through which the thermal exchange reaction has to pass in order to cool the consumable liquid. My design incorporates a direct contact between the consumable liquid and the ice, maximizing the contact surface area and therefore the effective cooling performance.

Molayem—U.S. Pat. No. 9,314,126 Beverage Container Having Built-In Infuser and Passive Cooling Element presents a detachable 'cold pack' that "comprises non-toxic freezer gel enclosed in a case" which must first be frozen before used in the device, meaning the assembly is unavailable for periods of time until the cold pack is actually frozen. This compares to my presented design which is readily available with only a few moments to reload the lower compartment that is used for cooling. My design also allows the user to define at which time the ice is exposed to the consumable liquid. Further, my design maximizes the time that the cooling medium can retain its colder temperature because it is not exposed to any other substance with which it would have a thermal exchange reaction, and therefor cause the temperature of the cooling medium to increase.

Hewitt et al.—U.S. Pat. No. 9,038,847 Insulted Beverage Apparatus and Cooling Device claims a base connected to an open end of a cylinder, the base "containing a fluid permanently sealed therein". The base is meant to be frozen, then attached to the cylinder which will receive a volume of consumable liquid in a configuration that causes contact between the base and the fluid, thereby cooling the liquid. This design presents a limited contact surface area between the base and the fluid, which limits the cooling action transferred to the liquid. Further, the base needs to be placed in a freezing device in order to be useful. This again limits the availability of the device for use during the extended time the base is being frozen. These limitations do not exist in my presented invention.

Dooley—US application #2013/0233866 Cool Cup illustrates a vessel with an interior defined space specifically meant to contain ice, which will provide a cooling effect to the liquid contained in the larger diameter mug, or "stein". While this presents a design that is quickly put into use, and allows replenishing of the cooling source (ice), the ice is prevented from mixing with the contained liquid and thereby will have a lessened impact on cooling the liquid as compared to my design which selectively allows the user to present a direct and complete contact between the liquid and the ice, and to control when that cooling exposure begins, resulting in a far greater thermal transfer between the ice and the liquid, more rapidly cooling the liquid.

What is required, and what my invention provides a solution for, is a reusable product that provides the ability to conveniently, effectively and immediately cool a consumable liquid in a container regardless of where you are, without the delay involved by requiring to place any portion of the container into a refrigerator, to increase the time that a cooling agent's (ice) lowered temperature is preserved prior to exposure to the consumable liquid, to provide enhanced cooling impact through direct and maximum surface contact between the cooling agent and consumable liquid, to do so for any liquid the person desires to consume and that is not limited in its design/fit/configuration in order to accommodate a specific commercially available prepackaged container.

BRIEF SUMMARY OF THE INVENTION

This invention presents an improvement to the convenience and ease of lowering fluid temperatures in a container suitable to consume the liquid from.

Specifically, in its preferred embodiment, my invention presents a product and method that provides the ability to conveniently, effectively and immediately cool a liquid in a container.

In one of my invention's preferred embodiments, a container is made up of an upper and a lower compartment, with a middle portion arranged between the upper and lower compartments. In operation, the lower compartment is used for storage of ice and the upper compartment is used for storage of the liquid to be consumed.

The upper compartment, lower compartment and middle portion can separate from each other, and then be reassembled to each other. The bottom of the upper compartment and the top of the lower compartment each has an orifice or several orifices. The middle portion also has an orifice or several orifices.

The connection between the middle portion and the upper compartment can be sealed so liquid will not pass between them. Likewise the connection between the middle portion and the lower compartment can be sealed so liquid will not pass between them.

Within the middle portion there is an orifice or series of orifices that can be in either an open or a closed position. While in the open position it allows substances to pass between the upper and the lower compartments. While in the closed position it prevents substances from passing between the upper and lower compartments.

Further, the middle portion can be repositioned at will by the user to allow liquid to pass from the upper compartment, through the middle portion and enter the lower compartment to come into direct contact with the contained ice. The middle portion can likewise be repositioned to not allow this fluid transfer between the upper and lower compartments, thereby increasing the time that the ice is insulated from any significant warming influences and so conserving its ability to provide a cooling influence to the liquid in the upper compartment when the user so chooses.

The position of the orifice (closed or open) is controlled by the user performing an operation to change it from closed to open or the opposite.

While the orifices in the upper, middle and lower compartments are in alignment with one another, substances are able to pass bi-directionally between the upper and the lower compartments. While the orifices in the upper, middle and lower compartments are not in alignment with one another, substances are not able to pass between the upper and the lower compartments.

In another of my invention's preferred embodiments, a container is made up of an upper and a lower compartment and a middle portion. The lower compartment can separate from the middle portion and the remaining upper compartment and connected middle portion can be used to contain consumable liquid without the lower compartment also being attached. At the user's preference, the lower compartment can be reassembled to the middle portion and the entire assembly by used to contain a consumable liquid in the upper compartment and a cooling medium (ie. ice) in the lower compartment.

The object of the present invention is to enable an individual to carry with them both the liquid they intend to consume as well as means to lower that liquid's temperature once it has warmed.

A further object of the invention is to present a product that is easily carried with a person while they are in a vehicle, and a product that fits in a typical cup holder of a vehicle.

A further object of the invention is to provide a container that has an upper, middle and a lower compartment, each able to separate from the other for use and also reassemble to each other to form a container that has upper, middle and lower compartments isolated from each other by a watertight sealing method.

A further object of the invention is to contain any liquid its user prefers to consume, regardless if they prepare the liquid themselves or purchase it from a retail outlet.

A further object of the invention is to allow its user to control the temperature of the consumable liquid through a means by which the cooling medium (ice) is kept separate from the liquid until such time that the user of the device chooses to expose the ice to the consumable liquid, thereby cooling the consumable liquid.

A further object of the invention is to avoid being limited in consumable liquid choices to only those whose prepackaged container will be accommodated by the device.

A further object of the invention is maximize the cooling ability of the ice through direct contact between the ice and the consumable liquid, with no intermediary materials or limited contact surface area.

A further object of the invention is to present a device that is always available for use, and that is reusable after each use.

LISTING OF REFERENCE CHARACTERS USED IN FIGS

Figure 1:
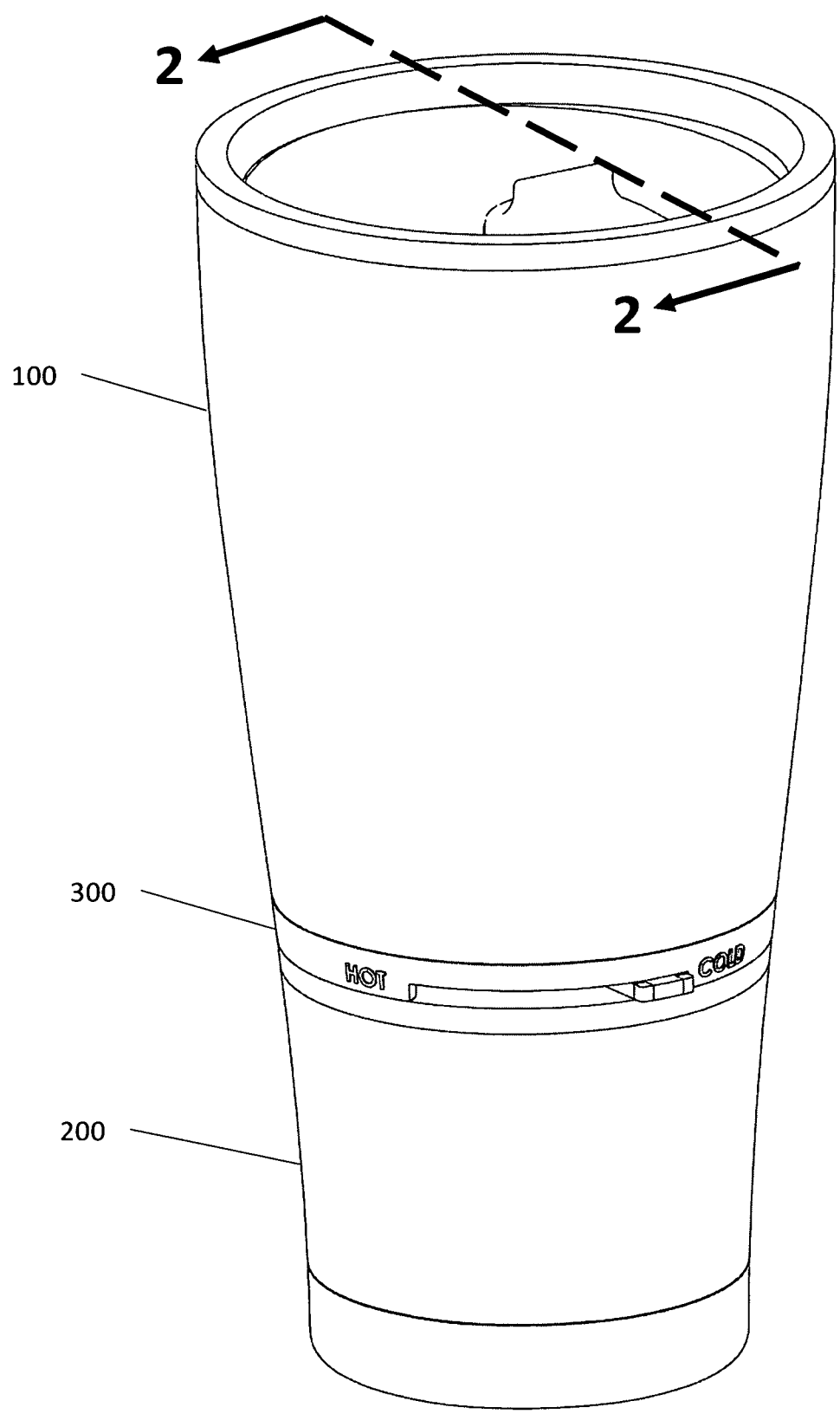
FIG. 1 shows a perspective view of one of the preferred embodiments of the invention, showing the upper compartment 100, the lower compartment 200 and the middle portion 300.
Figure 2:
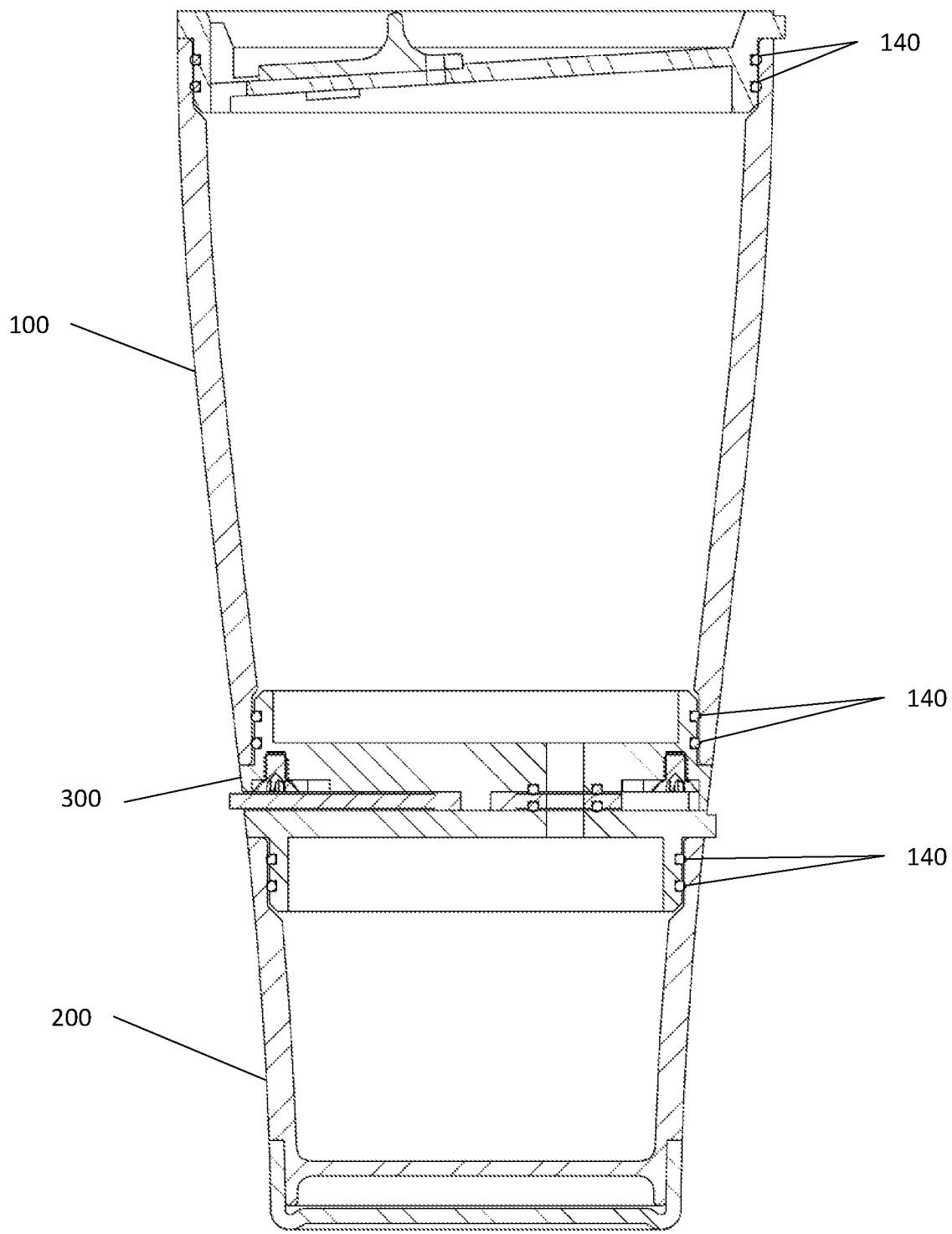
FIG. 2 shows a cutout section of one of the preferred embodiments of my invention.
Figure 3:
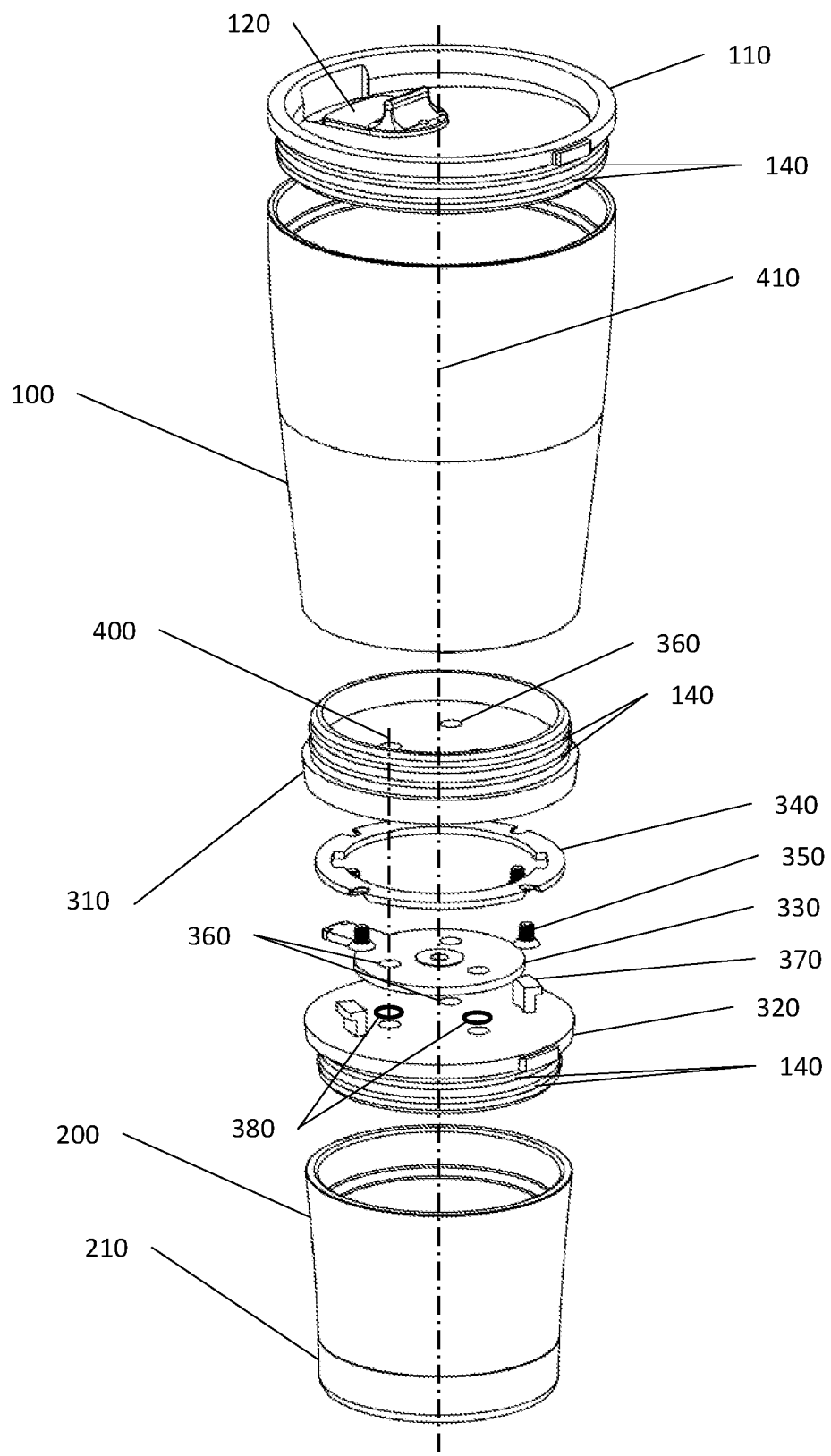
FIG. 3 shows an exploded view of one of the preferred embodiments of my invention, illustrating the arrangement of all components in juxtaposition to one another.

100 Upper Compartment
110 Top
120 Cover
140 Seal
200 Lower Compartment
210 Bottom
300 Middle Portion
310 Middle Upper
320 Middle Lower
330 orifice disk 340 Seal
350 Fastener
360 Orifice
370 Hook
380 O-ring
400 Alignment Axis
410 Vertical Centerline Axis

DETAILED DESCRIPTION OF THE INVENTION

One preferred embodiment of my invention includes an upper compartment 100, a lower compartment 200 and a middle portion 300. The middle portion 300 contains several instances of orifice 360. The orifices 360 can be in either an open or a closed position, determined by the user performing a simple operation. When the orifices 360 are in the closed position there is no transfer of substances between the upper compartment 100 and lower compartment 200. When the orifices 360 are in the open position substances are able to move between the upper compartment 100 and lower compartment 200.

In operation, upper compartment 100 contains a consumable liquid, and lower compartment 200 contains frozen ice. Middle portion 300 is comprised of middle upper 310, middle lower 320, orifice disk 330, several seal 340 instances, several fastener 350 instances, several orifice 360 instances, several o-ring 380 instances and multiple hook 370 instances.

Upper compartment 100 is connected to top 110 through a compression fit with multiple seal 140 instances.

Cover 120 is secured to top 110 in a sliding repositionable arrangement.

Lower compartment 200 is connected to bottom 210 through a compression fit between the parts.

Middle upper 310 contains several orifice 360 instances spaced circumferentially and at an equal distance about the center of middle upper 310.

Middle upper 310 is connected to upper compartment 100 through a compression fit with multiple seal 140 instances.

Middle lower 320 contains several orifice 360 instances spaced circumferentially and at an equal distance about the center of middle lower 320.

Middle lower 320 is connected to lower compartment 200 through a compression fit with multiple seal 140 instances.

Orifice disk 330 has several orifice 360 instances spaced circumferentially and at an equal distance about the center of orifice disk 330.

Orifice disk 330 is placed in close proximity to middle lower 320 with one instance of O-ring 380 positioned between each instance of orifice 360 in orifice disk 330 and middle lower 320.

Alignment axis 400 defines a line through the center of each orifice 360 instance in middle lower 320, o-ring 380 and orifice 360 in orifice disk 330 when my invention is in the open position.

Fasteners 350 connect seal 340 to middle upper 310.

Each instance of hook 370 secures middle lower 320 to middle upper 310.

In operation, the user rotates orifice disk 330 until all orifice 360 instances in middle upper 310, middle lower 320 and orifice disk 330 are aligned about the respective alignment axis 400. This allows passage of liquid between upper compartment 100 and lower compartment 200, through middle portion 300.

It is to be understood that beyond the herein described preferred embodiment of my invention, presented here as an illustration for understanding in general terms the benefits, characteristics and advantages its design affords, further embodiments or details are claimed to be protected as well as they fall within the scope and spirit of the broad wording and understanding of the claims herein attached.

I claim:

1. A multi-compartmental beverage container comprising:
an upper compartment (100);
a lower compartment (200);
a middle portion (300);
a top (110);
a bottom (210);
a plurality of seals (140);
said middle portion (300) comprises a middle upper (310), a middle lower (320), a orifice disk (330), a ring seal (340), a plurality of fasteners (350), and a plurality of O-rings (380);
said top (110) is connected with and sealed to said upper compartment (100) through a compressive means involving a plurality of said seals (140) and fit with a cover (120) in a sliding arrangement;
said middle upper (310) has a plurality of orifices (360) arranged circumferentially around and in equal distances from a center of said middle upper (310);
said middle upper (310) connects to said upper compartment (100) through a compressive means involving a plurality of said seals (140);
said middle lower (320) has a plurality of orifices (360) arranged circumferentially around and in equal distances from a center of said middle lower (320);
said middle lower (320) connects to said lower compartment (200) through a compressive means involving a plurality of said seals (140);
said lower compartment (200) accommodates attachment to said bottom (210);
said orifice disk (330) and said ring seal (340) are arranged between said middle upper (310) and said middle lower (320) in a concentric fashion;
said ring seal (340) is fastened to said middle upper (310) through a plurality of said fasteners (350);
said middle lower (320) connects with said middle upper (310) through a plurality of hooks (370);
said orifice disk (330) has a plurality of orifices (360) arranged circumferentially around and in equal distances from a center of said orifice disk (330);
a plurality of said O-rings (380) are arranged concentrically around each said orifice (360) in said orifice disk (330) and positioned between said orifice disk (330) and said middle lower (320) thereby forming a compressive seal such that a consumable liquid may be contained separately in said upper compartment (100), whereby ice is configured to be contained separately in said lower compartment (200), and said orifice disk (330) is able to be rotated about a vertical centerline axis (410) of the container by a user of the container causing said plurality of said orifices (360) in said middle upper (310), said middle lower (320) and said orifice disk (330) to be concentric about an alignment axis (400) which passes concentrically through each said orifice (360), or to cause each said orifice (360) to not be in alignment with said alignment axis (400), when each said orifice (360) is concentric about said alignment axis (400) fluid passage between said upper compartment (100) and said lower compartment (200) through said middle portion (300) is supported, thereby causing a cooling of the consumable liquid through direct contact with the ice contained in said lower compartment (200), when each said orifice (360) is not concentric with said alignment axis (400) fluid passage between said upper compartment (100) and said lower compartment (200) through said middle portion (300) is not supported.

2. The multi-compartmental beverage container described in claim 1, where said top (110) and said middle upper (310) each has a threaded attachment means to connect to said upper compartment (100), and said middle lower (320) and said bottom (210) each has a threaded attachment means to connect to said lower compartment (200).

3. The multi-compartmental beverage container described in claim 1, where said lower compartment (200) and said bottom (210) are formed as a single piece.

4. The multi-compartmental beverage container described in claim 1, where said upper compartment (100) and said middle upper (310) are formed as a single piece.

5. The multi-compartmental beverage container described in claim 1, where said plurality of said orifices (360) are configured concentrically about said alignment axis (400) by a sliding means of movement of said orifice disk (330).

* * * * *